UNITED STATES PATENT OFFICE.

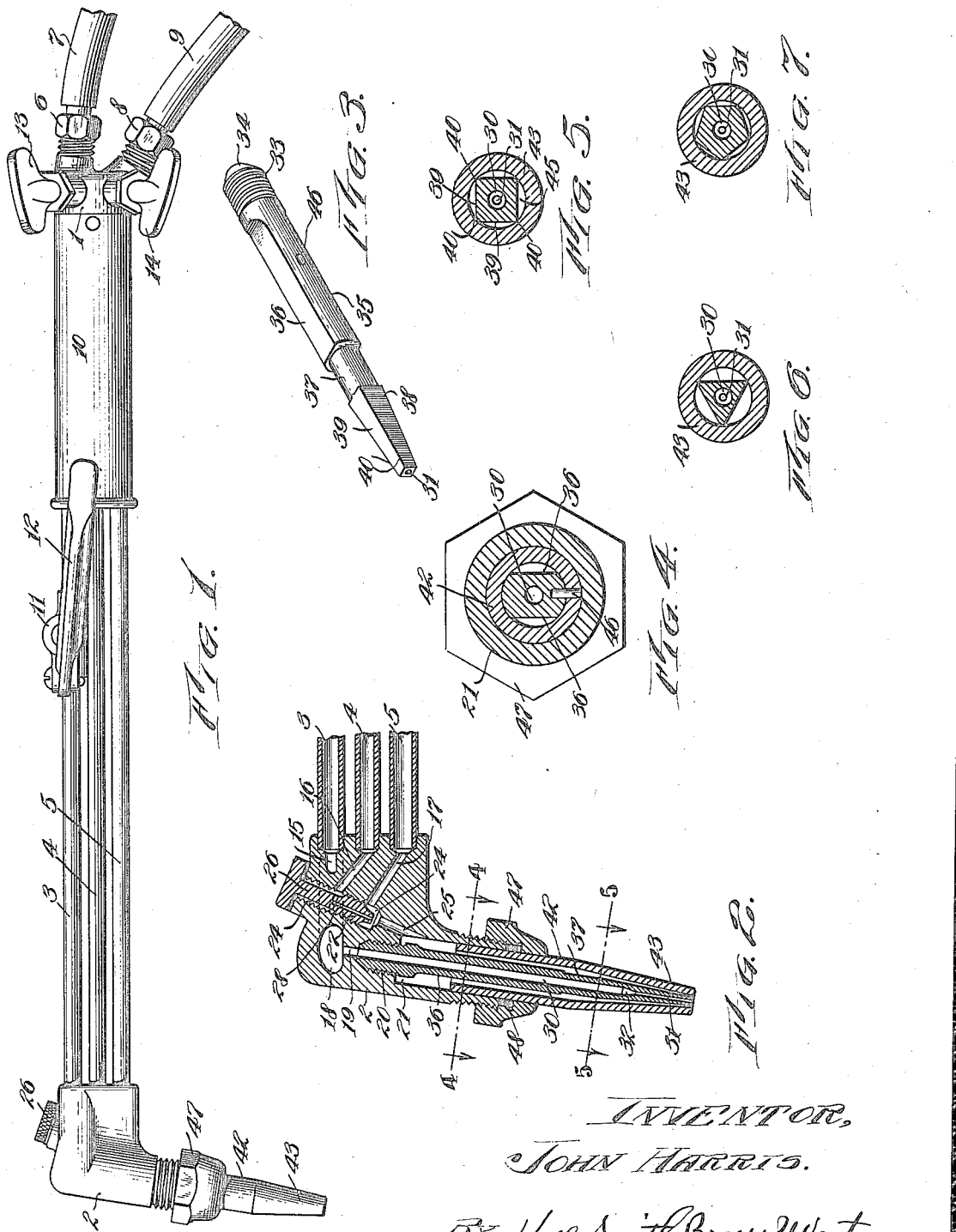

JOHN HARRIS, OF LAKEWOOD, OHIO, ASSIGNOR OF ONE-HALF TO JAMES R. ROSE, OF EDGEWORTH, PENNSYLVANIA.

BLOWPIPE.

1,424,163.  Specification of Letters Patent.  Patented Aug. 1, 1922.

Application filed August 26, 1918. Serial No. 251,409.

*To all whom it may concern:*

Be it known that I, JOHN HARRIS, a citizen of the United States, residing at Lakewood, in the county of Cuyahoga and State of Ohio, have invented a certain new and useful Improvement in Blowpipes, of which the following is a full, clear, and exact description, reference being had to the accompanying drawings.

This invention relates to blow-pipes such as are employed in the art of cutting and welding metals with gases. The objects of the invention are the provision of a blow pipe which shall be particularly simple and economical to construct and convenient to use; which will not back-fire or snap back; the provision of a blow pipe tip which can be readily manufactured, which shall be absolutely symmetrical and which can be readily and conveniently cleaned; while further objects and advantages of my said invention will become apparent as this description proceeds.

In the drawings accompanying and forming a part of this application, I have shown certain embodiments of my said invention although it will be understood that the same constitute only a few out of the great number of mechanical forms in which my inventive idea may be utilized. In these drawings Fig. 1 is a side elevation of a complete blow-pipe constructed in accordance with my invention; Fig. 2 is a longitudinal sectional view through the blow-pipe head and tip; Fig. 3 is a perspective view of the tip-core; Figs. 4 and 5 are sectional views corresponding to the lines 4—4 and 5—5 respectively of Fig. 2; and Figs. 6 and 7 are similar sectional views illustrating modified forms of tip construction.

Describing by reference characters the various parts herein illustrated, 1 represents the tail member and 2 the head member of a standard metal-cutting blow pipe, the same being connected by three parallel tubes 3, 4, and 5, the first being the conduit for the cutting oxygen, the second that for pre-heating oxygen, and the third that for the combustible gas. Carried by the tail member 1 is a supply connection 6 for oxygen, to which may be connected the oxygen supply-pipe 7, and which communicates with the pipes 3 and 4 by suitable passageways (not shown). Also carried by the tail piece 1 is a second connection 8 adapted for the reception of the flexible pipe 9 leading to the gas supply, and communicating with the pipe 5 by a passageway (not shown). The three pipes are here shown surrounded by the hollow shell 10 constituting a handle for the torch. The conduit 3 at some point in its length is provided with a quick opening valve 11 of the usual or any suitable type, controlled by a lever 12 which projects into convenient operative relation with the shell 10. The conduit 4 is controlled by a stop cock 13 and the conduit 5 by the stop-cock 14, both carried by the tail member 1.

The head 2 is formed with passageway 15, 16, and 17 communicating respectively with the conduits 3, 4, and 5. The passageway 15 connects with the chamber 18 from which leads the oxygen-passageway 19 preferably coaxial of the tip, the outer portion of this passageway being enlarged and threaded as shown at 20. Beyond this threaded portion the head is enlarged yet further as shown at 21, constituting a receiving socket and mixing chamber.

The rearward portion of the head, out of alignment with the passageway 15 and chamber 18, is formed with a threaded opening 24 which intersects the passages 16 and 17, and whose inner end communicates with the chamber 21 by means of an axial bore 25. Threaded in the outer portion of this opening is the plug 26 whose inner end is exteriorly enlarged so as to fill the opening between the passageways 16 and 17 and is formed interiorly with a bore 28 communicating with the passageway 16. The inner end of said plug is tapered and this tapered end extends across the passageway 17 forming an injector of a well known type.

The tip is made in two parts, a core and a shell, which are formed independently and subsequently assembled together. The core or inner member comprises a plug having throughout the major portion of its length a central axial bore 30 of the same diameter as and adapted to register with the passageway 19. At its lower end the bore 30 is reduced to form a restricted orifice 31 which merges into the larger bore by means of an inclined or tapered passage 32 to facilitate the even flow of the gas from the larger to the restricted portion of the central bore. At its upper end, the exterior of this core is provided with a thread 33 adapted to engage the socket 20, and with a seating portion 34 of any suitable or desired type adapted to make and maintain a gas tight joint at this point. Below the threaded portion 33 the plug is made of cylindrical shape as shown at 35, the sides thereof being flattened as shown at 36 or otherwise grooved to form passageways. This portion is succeeded by a reduced cylindrical portion 37, and this again in turn by a frusto-pyramidal portion 38, characterized by the possession of a plurality of flat inclined sides 39 defined by tapering edges 40 which terminate at the end of the tip.

The shell of the tip consists of a metal tube 42 having a cylindrical portion of an interior size adapted to receive snugly the cylindrical portion 35 of the core and having an external diameter such as to fit snugly within the outer end of the chamber 21. The lower extremity of this shell is tapered both interiorly and exteriorly as shown at 43, the inner wall at this point preferably making an angle of approximately four and one half degrees with the axis of the same, as described and claimed in my application #225,431, filed March 29, 1918, although for purpose of the present invention I do not limit myself thereto. The inclination of the faces 39 of the core is such as to bring the edges 40—40 into close juxtaposition with the inner wall of this shell thus forming a number of symmetrically arranged narrow passages 45 equal in number to the sides of the core. The parts of the tip are preferably held together by means of one or more suitable pins 46 traversing the shell and the cylindrical portion of the core, and the entire core is held in the head by the engagement of the thread 33 with the socket 20. A gland nut 47 is preferably screwed upon the exterior of the head and embraces the tip, being provided with packing 48 so as to prevent any possible leakage.

The valve 11 is closed excepting when the handle 12 is depressed; and in the normal use of the pipe the stop cocks 13 and 14 are so adjusted that the oxygen entering into the pipe 4 will aspirate the gas through the conduit 5 to make a strongly burning mixture which is first commingled in the empty bottom portion of the chamber 21 whence it passes along the flat sides of the tip core to the distributing channel 37 whence it issues from the tip by way of the flat-walled channels 45. Upon pressing the lever 12 an additional jet of oxygen under comparatively high pressure is caused to issue through the axial opening 31, but without any appreciable change in the amount of gas passing around the exterior of the tip core.

The two main operating defects in this class of devices have generally been either a blowing out of the flame by the rush of oxygen through the central bore or a snapping-back of the flame into the side passages, which might occur at any time. The former defect can be overcome by setting the side passages at exactly the right angle, which is very easily done with the present construction, since the prismatic faces can be milled with great accuracy, whereas the bored apertures heretofore employed cannot be made with exactness. Also the snapping-back is eliminated since the wide and shallow passageways are not well suited to the propagation of flame owing to the cooling effect produced by the spreading of the gaseous mixture into sheets which effectively cool the walls of the tip members below the point at which flame will be propagated through the passages.

The number of faces can be varied very widely within my invention. I have shown three, four and five and employ the same in practice in different sized blow pipes, taking care always to make the width of the passageways so small as to prevent the propagation of flame therealong, and securing larger gas capacity by increasing the number of passages.

It will be noted that the shell consists of a plain metal tube entirely devoid of threads or other irregular portions. It is secured in place solely by its attachment to the core, the latter being also of a very simple shape. As a result the structure is very inexpensive and can be cheaply replaced when destroyed by inadvertence on the part of the workmen as very frequently occurs in such devices.

It will be understood that the conformation of the sides 36 has no necessary connection with that of the sides 39, and in general that great changes can be made within the scope of my invention which is limited only by the prior art and the claims hereto annexed.

Having thus described my invention what I claim is:—

1. A tip for blowpipes comprising a core member having a bore therethrough and an external circumferential groove, the portion of said core at one side of said groove being frusto-pyramidal and the portion at the other side having cylindrical surfaces and longitudinal passageways disconnected from said bore, in combination with a shell having a frusto-conical portion closely embracing the first mentioned portion of said core and a cylindrical portion closely embracing the second mentioned portion of said core.

2. In a blow pipe tip, a core having at one end a frusto-pyramidal portion and at the other end a screw thread, in combination with a hollow unthreaded shell rigidly attached to said core and closely embracing the frusto-pyramidal portion and terminating short of said screw thread.

3. In a blow pipe, a core having a frusto-pyramidal portion and a cylindrical portion separated by an external circumferential groove, said cylindrical portion having passageways extending longitudinally thereof, in combination with a shell having a cylindrical portion secured to and snugly embracing the cylindrical portion of the core and a tapered portion embracing the frusto-pyramidal portion of the core.

4. In a blowpipe tip, a longitudinal bored core having in succession a threaded portion, a cylindrical portion, a groove, and a frusto-pyramidal portion, in combination with a transversely circular shell rigidly attached to said core and snugly embracing said frusto-pyramidal and cylindrical portions, said shell having an exteriorly smooth cylindrical portion which terminates short of the threaded end of said core, passageways being provided along the core from said groove to the end of said shell nearest the threads.

5. In a blowpipe, in combination, a head having a cylindrical socket, a core projecting axially through said socket, said core having a central bore and external flattened portions, and a shell surrounding and carried by said core and defining with such flattened portions a plurality of narrow passageways for gas, said shell comprising a plain tube part of which is cylindrical to fit into said socket and part of which is tapered to produce a narrow point.

In testimony whereof, I hereunto affix my signature.

JOHN HARRIS.